Oct. 16, 1951  W. W. HANSEN  2,571,129
SCANNING ANTENNA SYSTEM
Filed Dec. 3, 1947  2 Sheets-Sheet 2

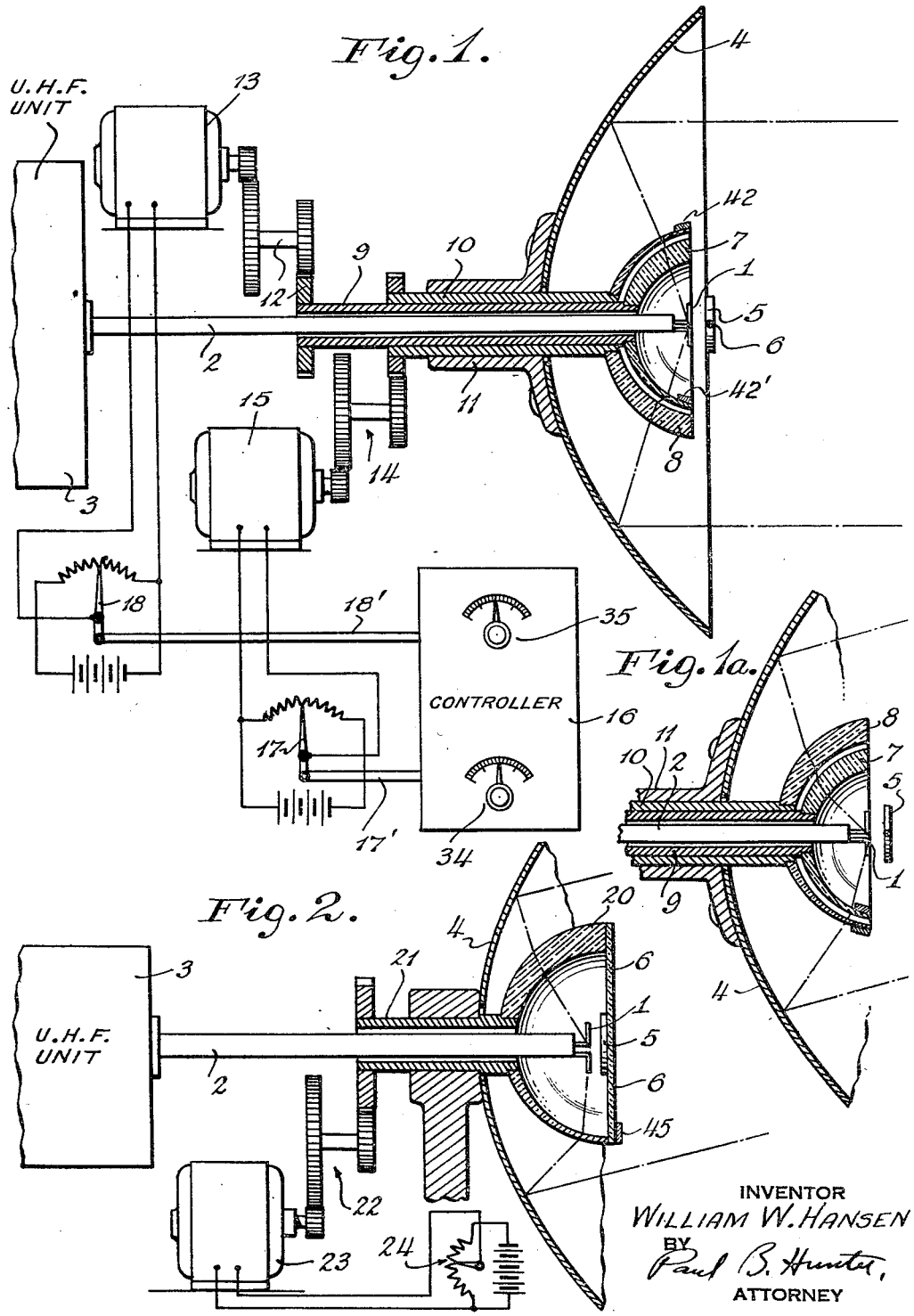

INVENTOR
WILLIAM W. HANSEN
BY
Paul B. Hunter
ATTORNEY

UNITED STATES PATENT OFFICE 2,571,129

SCANNING ANTENNA SYSTEM

William W. Hansen, Stanford University, Calif., assignor to The Sperry Corporation, a corporation of Delaware Application December 3, 1947, Serial No. 789,472

6 Claims. (Cl. 250—33.65)

This invention relates generally to directive antenna scanning systems and the invention has reference more particularly to a novel scanning system suitable for continuous scanning through any of a plurality of scanning patterns, the said system employing dielectric lenses or wedge members for effecting various types of tracking and searching scans.

Directive antenna scanning systems have been employed in various types of radar and radio navigation systems for the purpose of locating and determining the position of objects and the distances thereto. Usually, such directive antenna systems are provided with a motor driven unit acting to either actuate a parabolic or other reflector at a regular angular rate to effect scanning, while in another structure the electromagnetic feed means, such as the antenna itself, is actuated physically to effect the desired scanning.

These prior systems are open to the objection that where the reflector itself is actuated, large inertia effects are set up which are detrimental to the mounting and the airplane or other support upon which the reflector is mounted. Furthermore, the speed of scan is strictly limited by such inertia effects, due generally to the use of an oscillating motion of the reflector or antenna resulting in large acceleration and deceleration forces causing undesired vibration. The same is true to a lesser extent when the antenna or feed is actuated, only in this case a further complication arises in that a mechanical rotating joint is usually provided in the coaxial line or other feed line and this ofttimes results in a variable standing wave ratio in the line and a consequent noise modulation which detracts from the sensitivity of the system.

Different types of radar systems serve different purposes and, for example, certain systems are used for enabling one aircraft to pick up and intercept another aircraft, as for the purpose of directing gun fire toward the intercepted craft. Another example is a radar system which enables one craft, such as an airplane, to search for a vessel upon the ocean floor to direct explosive charges toward the vessel.

Another use of radar systems is for tracking of a target after it is located. These different types of radar systems employ different types of scan, such as, for example, spiral scanning, conical scanning, linear scanning, circular scanning, etc.

The apparatus of the present invention is particularly valuable as where a rapid scanning operation is desired for effecting limited spiral search scan and subsequently a conical tracking scan is desired. The same utilizes dielectric wedge lens devices for refracting the radiation pattern, which wedge lens devices are angularly turned or moved to effect the desired scanning operation. When using such wedge lens devices, it is not necessary to move either the antenna feed or the reflector employed, thereby greatly reducing inertia effects and eliminating rotating joints which produce a variable standing wave ratio in the feed line and resultant microphonic noises. The present apparatus is especially suitable where a limited field of view is desired to be scanned, as in tracking operations, as where an interceptor aircraft is tracking another aircraft for purposes of interception.

Therefore, one object of the present invention is to provide a novel scanning antenna system employing a movable wedge lens or lenses disposed in the path of the electromagnetic energy passing out of or into an antenna or feed, for the purpose of causing refraction of the electromagnetic energy and disposed so as to effect a desired scanning operation.

Another object of the present invention is to provide a novel scanning antenna system suitable for effecting a plurality of scans such as a spiral scan, a modified spiral scan, conical scan, etc., such scans being effected without varying the polarization of the electromagnetic energy employed.

Another object of the present invention is to provide a novel scanning antenna system wherein inertia effects, a variable standing wave ratio in the feed line and resultant microphonic noises are greatly reduced by the elimination of rotating joints and physical movement of antenna reflectors and energy feeds.

The invention also relates to the novel features or principles of the instrumentalities described herein, whether or not such are used for the stated objects, or in the stated fields or combinations, for example, the apparatus of the present invention is equally suited for purposes of transmission or reception of electromagnetic energy, or both.

A further object of the invention is to provide a novel scanning antenna system employing a parabolic reflector or other electromagnetic energy deflecting means and an ultra-high-frequency electromagnetic wave feed as an emanating source or receiving means for radiating or receiving a beam of electromagnetic energy, together with means for varying the direction of the beam relative to the axis of the energy deflecting means, while maintaining the relative position of the emanating source or receiving means and the deflecting means fixed, said direction varying means comprising a movable dielectric or dielectrics interposed in the path of at least a part of the emanating electromagnetic energy.

Further objects and advantages will become apparent from the following specification and drawings, like reference numerals designating corresponding parts, wherein Fig. 1 is a view, partly in section, of a form of the novel scanning antenna system of the present invention;

Fig. 1a illustrates the operation of the system of Fig. 1 in effecting spiral scanning;

Fig. 2 is a view similar to Fig. 1 of a somewhat modified construction suitable for effecting conical scanning;

Figure 3:
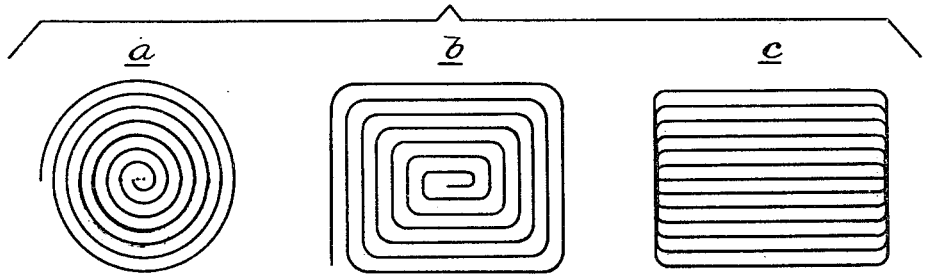
Fig. 3 illustrates a series of diagrams showing different types of scan made possible by the apparatus of the present invention.

Referring now to Figs. 1 and 1a of the drawings as illustrated, the reference numeral 1 designates a dipole feed or antenna element connected to a concentric line 2 which in turn is connected with an ultra-high-frequency energy supply unit 3. If desired, the unit 3 could be a receiver or a combination transmitter-receiver. The antenna element or feed 1 is positioned substantially at the focus of a parabolic deflector or reflector 4 that is shown fixed in space relative to the antenna element 1. This structure alone would, therefore, produce a simple fixed beam of substantially parallel elements or rays of electromagnetic energy, extending outwardly from the reflector 4. A small disc-type reflector 5 is shown supported by members 6 in front of the antenna element or feed 1 in order to effect rearward reflection of forwardly directed energy and thereby prevent undesired dispersion of the beam energy.

Figure 1B:
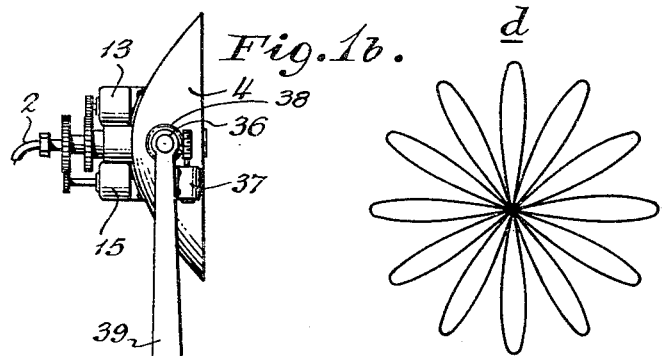
Fig. 1b illustrates the system of this invention adapted for varying the search sector.

Should it be desired to vary the sector or area being searched by the system of the present invention, the same may be universally mounted as shown in Fig. 1b. In this figure, the reflector 4 of Fig. 1 is shown provided with trunnions 36 adapted to be turned through use of a motor 37 and gearing 38 mounted on a pedestal 39, thereby effecting variations in the elevational angle of the reflector. Turning movement of the reflector in a transverse direction is obtained by use of a motor 40 acting through gearing 41 to turn the pedestal 39. This may be done manually if desired. In this way, manual or automatic tracking of a target or object may be obtained. It will be noted that in Fig. 1b, the motors 13 and 15 later to be described are shown mounted upon the rear of the reflector 4.

In accordance with the principles of the present invention, in order to effect spiral scanning of the type shown at (a) in Fig. 3, there is positioned intermediate the antenna element 1 and the reflector 4, a pair of cup-shaped dielectric members or wedge lenses 7 and 8. The wedge member 7 is shown fixedly supported at its center upon a hollow shaft 9 in external relation to the antenna feed 2. Shaft 9 is turnably supported in a hollow shaft 10 that is carried by a bearing 11 shown attached to reflector 4, although this bearing may be separately supported, if desired. The hollow shaft 9 carrying the wedge lens member 7 is adapted to be rotated by gearing 12 driven by a reversible, variable speed motor 13. Similarly the dielectric member 8 which is supported upon the forward end of the hollow shaft 10 is adapted to be rotated by gearing 14 driven by a reversible, variable speed motor 15. A suitable controller 16 is shown connected for actuating rheostat arms 17 and 18 to effect variable speed operation of the motors 13 and 15, and hence variable speed rotation of the dielectric wedge members 7 and 8. This controller is shown with control knobs 34 and 35 operating through suitable gearing or transmission means for actuating rods 17' and 18'.

With the dielectric wedges 7 and 8 in the position shown in Fig. 1, it will be noted that the thin portion of wedge 8 is adjacent the thick portion of wedge 7, and likewise, the thin portion of wedge 7 is adjacent the thick portion of wedge 8. Thus, these two dielectric members together in the position shown in Fig. 1 would present an overall uniform thickness of dielectric to the energy radiating from antenna feed 1, so that, as indicated by the dot-dash lines, this energy, after striking the reflector 4, is directed directly forwardly and coaxially with the antenna feed line 2.

In providing spiral scanning, the motors 13 and 15 rotate the wedges 7 and 8 in the same directions but at different speeds. The beam gradually shifts from the position shown in Fig. 1 to that shown in Fig. 1a, and then back to the position shown in Fig. 1, while at the same time, the beam moves circularly thereby defining a spiral path as shown in Fig. 3a. By proper control of relative motor speeds by use of controller 16, the spiral scan may be modified to produce a different type of scan as shown in Fig. 3b. A further modified scan is shown in Figure c of Fig. 3. Still another form of scan is that illustrated in Fig. 3d, which is a form of rose scan, which can be obtained by proper proportioning of the relative speeds of the motors. By operating the motors in opposite directions so that the wedge lenses 7 and 8 move in opposite directions, still other types of scan can be obtained.

In the form of the invention shown in Fig. 2, only a single dielectric wedge lens is employed; namely, lens 20, said lens being mounted upon the forward end of a hollow shaft 21 rotated by gearing 22 and driven from motor 23. The parts of the structure of Fig. 2 similar to those of Fig. 1 are similarly numbered. It will be noted that in Fig. 2, the disc reflector 5 is carried by a supporting member 6, mounted directly on the dielectric lens 20. The lens 20, in cooperating with the reflector 4 effects a conical scan, the angular amplitude of the scanning depending upon the relative thickness of the two halves of lens 20. A variable rate of scan can be obtained by varying the setting of rheostat 24.

Figure 4:
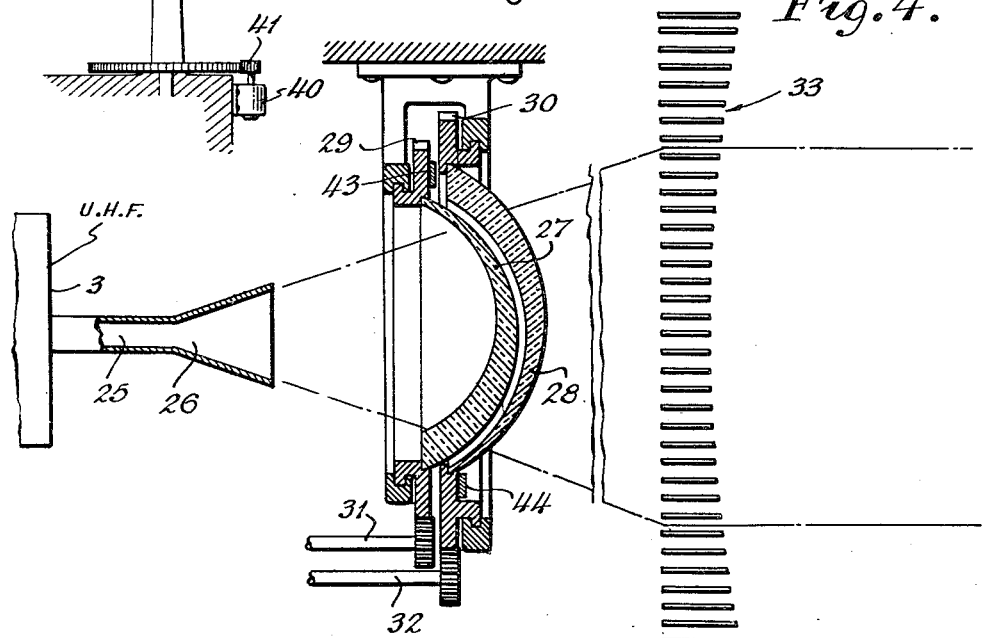
Fig. 4 is a modified construction.

In the structure shown in Fig. 4, the ultra-high-frequency energy fed from or received by source 3 is shown fed through a wave guide 25, which energy flows out through a horn or other antenna feed 26. This energy passes through to cup-shaped dielectric wedge lenses 27 and 28 which are rotated coaxially with the axis of feed line 25. These wedge lenses are shown supported by ring gears 29 and 30 driven by suitable gearing 31 and 32, which serve to effect rotation of the wedge lenses 27 and 28. Thus, the energy from the horn or mouth 26 is caused to be refracted by the wedge lens members 27 and 28 to effect either spiral, modified spiral or conical scans, conical scanning being effected by rotating the wedge lenses together at the same speed with their thin edges adjacent. This is also possible in the structure of Fig. 1. The refracted electromagnetic energy leaving the wedge lenses is shown passing through a converging metal lens 33 to thereby prevent undue dispersion of the energy leaving the dielectric lenses. If desired, it is to be understood that instead of using dielectric lenses such as 27 and 28, metal lenses may be employed of suitable design. A dielectric lens may also be employed in place of metal lens 33.

The apparatus of Fig. 4 is suitable for effecting the various types of scan shown in Fig. 3 as well as innumerable variations thereof, depending upon the direction and rates of rotation of the dielectric wedge lenses 27 and 28.

It will be noted that in employing the scanning antenna system of the present invention, the movement of heavy structures and resultant damaging vibration is avoided. Thus, angular rotation of the reflector 4 is avoided, as well as angular movement of feed shaft 2 or 25 as in Fig. 4. Furthermore, in Fig. 4, the metal lens is not moved. The only motion is that of the dielectric lenses and their supporting members. If desired, the dielectric lenses may be dynamically balanced as by use of small counter weights such as indicated at 42 and 42' in Fig. 1, 45 in Fig. 2, 43 and 44 in Fig. 4 so that rotational moments and hence inertia forces and resulting vibration are not set up through the rotation of these lenses. This greatly reduces inertia effects. Movement of the entire scanning system provided for in Fig. 1b is relatively slow or intermittent and hence not damaging.

Although the dielectric lenses are illustrated as having smooth contours, it is to be understood that these lenses may have stepped contours if desired. The same is true of the metal lens 33.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. In a scanning antenna system comprising an antenna feed, a parabolic reflector for directing the electromagnetic energy fed from said antenna feed, and a pair of cup-shaped dielectric wedge members interposed between said antenna feed and said reflector, one of said wedge members being cupped within the other, said wedge members being relatively movable for effecting scanning operations of the energy emitted from said antenna feed.

2. In a system of the character described having a transmitter or receiver arranged for transmitting or receiving electromagnetic waves, a directive antenna element coupled to said transmitter or receiver, a plurality of dielectric wedge lens members interposed in the path of electromagnetic energy received by or transmitted from said antenna element, said lens members being of hollow substantially semi-spherical shape with said antenna element located substantially at the center of curvature thereof, means for moving said wedge lens members with respect to each other and with respect to said antenna element for effecting deflection of the electromagnetic energy, and additional means cooperating with said wedge lens members for further deflecting said electromagnetic energy.

3. Apparatus as defined in claim 2 wherein said deflecting means comprises a parabolic reflector disposed adjacent said antenna element and said wedge lens members, said antenna element and said parabolic reflector being relatively stationary.

4. Apparatus as defined in claim 2 wherein said deflecting means comprises a metallic lens structure positioned adjacent said antenna element and said wedge lens members, said antenna element and said metal lens being relatively stationary.

5. In a scanning system of the character described, an antenna feed element for receiving or transmitting electromagnetic energy, dielectric substantially semi-spherical telescoped wedge members positioned for intercepting the energy passing to or from said antenna element for effecting deflection of such energy, additional means cooperating with said antenna element and said dielectric wedge lens members for effecting further deflection of the electromagnetic energy, and means for orienting said antenna element, said dielectric wedge lens members, and said additional deflecting means to select the field of scan of said system.

6. In a scanning antenna system, an antenna feed comprising a concentric line fed dipole, a reflector positioned in front of said dipole, a parabolic deflector positioned to the rear of said dipole with its focus substantially coinciding with said dipole, said parabolic deflector receiving energy from said dipole and as reflected from said reflector, a pair of cup-shaped dielectric wedge members interposed between said dipole and said parabolic deflector, one of said wedge members being cupped within the other and with said dipole positioned substantially at the center of curvature of said cup-shaped wedge members, said wedge members being relatively movable for effecting scanning operations of the energy emitted from said antenna feed.

WILLIAM W. HANSEN.

REFERENCES CITED

The following references are of record in the file of this patent:

UNITED STATES PATENTS

| Number | Name | Date |
| --- | --- | --- |
| 695,916 | Dickson | Mar. 25, 1902 |
| 1,618,090 | Jenkins | Feb. 15, 1927 |
| 1,689,847 | Zworykin | Oct. 30, 1928 |
| 2,401,759 | Hersey | June 11, 1946 |
| 2,422,579 | McClellan | June 17, 1947 |
| 2,429,601 | Biskeborn et al. | Oct. 28, 1947 |

FOREIGN PATENTS

| Number | Country | Date |
| --- | --- | --- |
| 631,802 | France | Dec. 27, 1927 |

OTHER REFERENCES

Metal-Lens Antennas by Winston E. Kock, Proc. I. R. E., November 1946 (decimal classification R326.8).